(12) United States Patent
Hutchison et al.

(10) Patent No.: US 8,255,648 B2
(45) Date of Patent: Aug. 28, 2012

(54) MAINTAINING STORAGE DEVICE BACKUP CONSISTENCY

(75) Inventors: Gordon D. Hutchison, Winchester (GB); Cameron J. McAllister, Winchester (GB); Lucy A. Raw, Winchester (GB); Bruce J. Smith, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/575,797

(22) Filed: Oct. 8, 2009

(65) Prior Publication Data

US 2010/0115218 A1     May 6, 2010

(30) Foreign Application Priority Data

Oct. 30, 2008   (EP) ..................... 08167940

(51) Int. Cl.
G06F 12/00 (2006.01)
G06F 13/00 (2006.01)
G06F 13/28 (2006.01)
G06F 7/00 (2006.01)
G06F 17/00 (2006.01)

(52) U.S. Cl. ......... 711/162; 711/112; 707/610; 707/690

(58) Field of Classification Search .................. 711/112, 711/162; 707/610, 690
See application file for complete search history.

(56) References Cited

U.S. PATENT DOCUMENTS

| | | | |
|---|---|---|---|
| 7,043,507 B2 | 5/2006 | Lanzatella et al. | |
| 2004/0260897 A1 | 12/2004 | Sanchez et al. | |
| 2005/0071708 A1* | 3/2005 | Bartfai et al. | 714/5 |
| 2005/0278391 A1 | 12/2005 | Spear et al. | |
| 2007/0033361 A1* | 2/2007 | Abdulvahid et al. | 711/165 |
| 2007/0174185 A1* | 7/2007 | McGoveran | 705/39 |
| 2008/0294858 A1* | 11/2008 | Sakai et al. | 711/161 |
| 2008/0307271 A1* | 12/2008 | Nakajima et al. | 714/47 |
| 2009/0300304 A1* | 12/2009 | Boyd et al. | 711/162 |
| 2011/0219192 A1 | 9/2011 | Hutchison et al. | |

OTHER PUBLICATIONS

International Search Report and Written Opinion dated May 4, 2010 for Application No. PCT/EP2009/064086 filed Oct. 26, 2009.

* cited by examiner

*Primary Examiner* — Jared Rutz
*Assistant Examiner* — Ryan Bertram
(74) *Attorney, Agent, or Firm* — Adam M. Steadman; Cynthia G. Seal

(57) ABSTRACT

A method, system, and computer program product are provided for maintaining a storage device backup consistency group. The method comprises receiving a first I/O command for a first storage device, receiving a second I/O command for a second storage device, identifying a transaction comprising both the first I/O command and the second I/O command, accessing a storage device backup consistency group for the first storage device, determining whether a backup for the second storage device is a member of the storage device backup consistency group, and performing a predefined corrective action if a backup for the second storage device is not a member of the storage device backup consistency group. The predefined corrective action may comprise detecting or creating a backup for the second storage device and then adding the detected or created backup to the storage device backup consistency group, invalidating the second I/O command, and/or issuing a warning.

18 Claims, 4 Drawing Sheets

MAINTAINING STORAGE DEVICE BACKUP CONSISTENCY

RELATED APPLICATIONS

This application claims priority under 35 U.S.C. §119 to European Patent Application No. 08167940.9 filed Oct. 30, 2008, the entire text of which is specifically incorporated by reference herein.

FIELD OF THE INVENTION

The various embodiments described herein relate to a method, system, and computer program product for maintaining a storage device backup consistency group.

BACKGROUND ART

Data storage in large organizations is of fundamental importance, both for data reliability and for the ability to recover data in the event of any hardware failure. Storage area network (SAN) is an architecture used when very large amounts of data must be stored in a reliable and secure manner. This technology allows networks to be created that support the attachment of remote computer storage devices such as disk arrays to servers in such a way that, to the operating system, the devices appear as locally attached. It is common in such networks to include a large amount of redundancy, both in the data storage and in the hardware connections among the individual components.

Various methods exist for creating data redundancy. For example, a function such as the flashcopy function enables an administrator to make point-in-time, full volume copies of data, with the copies immediately available for read or write access. The flashcopy can be used with standard backup tools that are available to create backup copies on tape. Flashcopy creates a point-in-time copy of a source volume on a target volume.

When a flashcopy operation is initiated, a relationship is created between a source volume and a target volume. This relationship involves a "mapping" of the source volume and the target volume. This mapping allows a point-in-time copy of the source volume to be copied to the associated target volume. The relationship exists between this volume pair from the time that the flashcopy operation is initiated until the time that the relationship is ended.

When data is physically copied, a background process copies tracks from the source volume to the target volume. The amount of time necessary to complete the background copy depends on various criteria, including the amount of data being copied, the number of background copy processes that are occurring, and any other activities that are presently occurring.

In storage, the user can create a flashcopy that creates a point-in-time backup of some storage disks. If the user subsequently has a storage problem, the user can use the flashcopy to restore the saved version of the data. More specifically, the direction of the flashcopy relationship can be reversed such that the volume that was previously defined as the target becomes the source for the volume that was previously defined as the source (which is now the target). In such case, modified data is copied to the volume previously defined as the source.

An administrator can reverse a flashcopy relationship if the administrator wishes to restore a source volume (volume A) to a point in time before the flashcopy operation was originally performed. In effect, the administrator is reversing the flashcopy operation so that it appears as though no flashcopy operation ever happened. The background copy process of a flashcopy operation must complete before it is possible to reverse volume A as the source and volume B as the target.

There will be certain circumstances when it is desired to reverse an original flashcopy relationship. For example, a flashcopy relationship may be created between source volume A and target volume B, and then data loss occurs on source volume A. In such case, it is possible to reverse the flashcopy relationship so that volume B is copied to volume A.

Backup processes, such as flashcopy, are commonly configured to occur automatically in relation to a storage volume such as a disk. Such backup occurs periodically, for example every 24 hours. It is also known to link the backup processes of multiple storage devices together in a storage device backup consistency group, which details multiple storage devices and their respective backup locations. A storage backup consistency group simplifies the backup process and also creates a single location to store the details of the backup for multiple storage devices, which in turn can be handled easily for administration purposes. However, a drawback of such a system is that if the underlying hardware is changed (e.g., through the addition of another storage device), the backup procedure for the new storage device may not be linked to an already existing storage device backup consistency group.

SUMMARY OF THE INVENTION

The various embodiments described herein improve upon the known art for backup storage consistency. For example, a method embodiment is provided for maintaining a storage device backup consistency group. The method comprises receiving a first input/output (I/O) command for a first storage device, receiving a second I/O command for a second storage device, identifying a transaction comprising both the first I/O command and the second I/O command, accessing a storage device backup consistency group for the first storage device, determining whether a backup for the second storage device is a member of the storage device backup consistency group, and performing a predefined corrective action if a backup for the second storage device is not a member of the storage device backup consistency group. Moreover, the method may comprise dynamically creating the storage device backup consistency group.

In another exemplary embodiment. a system is provided for maintaining a storage device backup consistency group. The system comprises a device driver for receiving a first I/O command for a first storage device and receiving a second I/O command for a second storage device. The system further comprises a transaction manager for identifying a transaction comprising both the first I/O command and the second I/O command, accessing a storage device backup consistency group for the first storage device, determining whether a backup for the second storage device is a member of the storage device backup consistency group, and performing a predefined corrective action if a backup for the second storage device is not a member of the storage device backup consistency group. In addition, the transaction manager may dynamically create the storage device backup consistency group.

In another exemplary embodiment, a computer program product is provided for maintaining a storage device backup consistency group. The computer program product may comprise a computer-readable storage medium having computer-readable program code instructions stored therein comprising a first set of computer instructions for receiving a first I/O command for a first storage device, a second set of computer instructions for receiving a second I/O command for a second storage device, a third set of computer instructions for identifying a transaction comprising both the first I/O command and the second I/O command, a fourth set of computer instructions for accessing a storage device backup consistency group for the first storage device, a fifth set of computer instructions for determining whether a backup for the second storage device is a member of the storage device backup consistency group, and a sixth set of computer instructions for performing a predefined corrective action if a backup for the second storage device is not a member of the storage device backup consistency group. Furthermore, the computer program product may comprise a seventh set of computer instructions for dynamically creating the storage device backup consistency group.

In accordance with the various embodiments, it is possible to provide an automated method for determining whether all of the storage devices that should be covered by a storage device backup consistency group are indeed so covered. The system uses the normal transactions that occur with respect to the storage devices to determine whether all of the storage devices referred to in any one transaction are all covered by the same consistency group. If all of the storage devices are not covered by the same consistency group, then the backup defined by the consistency group is not sufficient for the enterprise storage system that includes the storage devices. Accordingly, corrective action is triggered by the detection of an incomplete consistency group.

It may be that a storage device backup already exists for the second storage device, but such backup is not a member of the storage device backup consistency group. In such case, the method step of performing the predefined corrective action comprises detecting a storage device backup for the second storage device and adding the detected storage device backup to the storage device backup consistency group. That is to say, if a backup already exists for the second storage device, then the backup may be added to the consistency group. Accordingly, detection and correction actions may be combined into a single automated process.

Conversely, a storage device backup may not yet exist for the second storage device. In such case, the method step of performing the predefined corrective action comprises creating a storage device backup for the second storage device and adding the created storage device backup to the storage device backup consistency group. In summary, if no backup exists for the second storage device, then the backup may be created and then may be automatically added to the consistency group.

Furthermore, the method step of performing the predefined corrective action may comprise invalidating the second I/O command and/or may comprise issuing an appropriate warning.

Normally, the definition of a backup task such as a flashcopy is done on a disk basis. However, it is possible to collect together multiple disk flashcopies into a single flashcopy consistency group to enable more than one disk snapshot to be taken at once. The placement of disk flashcopies into one or more flashcopy consistency groups is normally a static and manual process, and thus generally additional configuration must be completed if a new disk is added to the set of disks holding the overall business application state. Omitting the new disk will mean that the flashcopy consistency group does not contain a consistent snapshot of all of the required disks. Since the new disk may not have existed at the time the application (or the backup script) on the host(s) was initially designed, a maintenance issue arises. As discussed herein, such issue is overcome by the method, system, and computer program product in accordance with the various embodiments.

BRIEF DESCRIPTION OF THE DRAWINGS

The various embodiments will now be described by way of example with reference to the accompanying drawings, in which.

DETAILED DESCRIPTION

Figure 1:
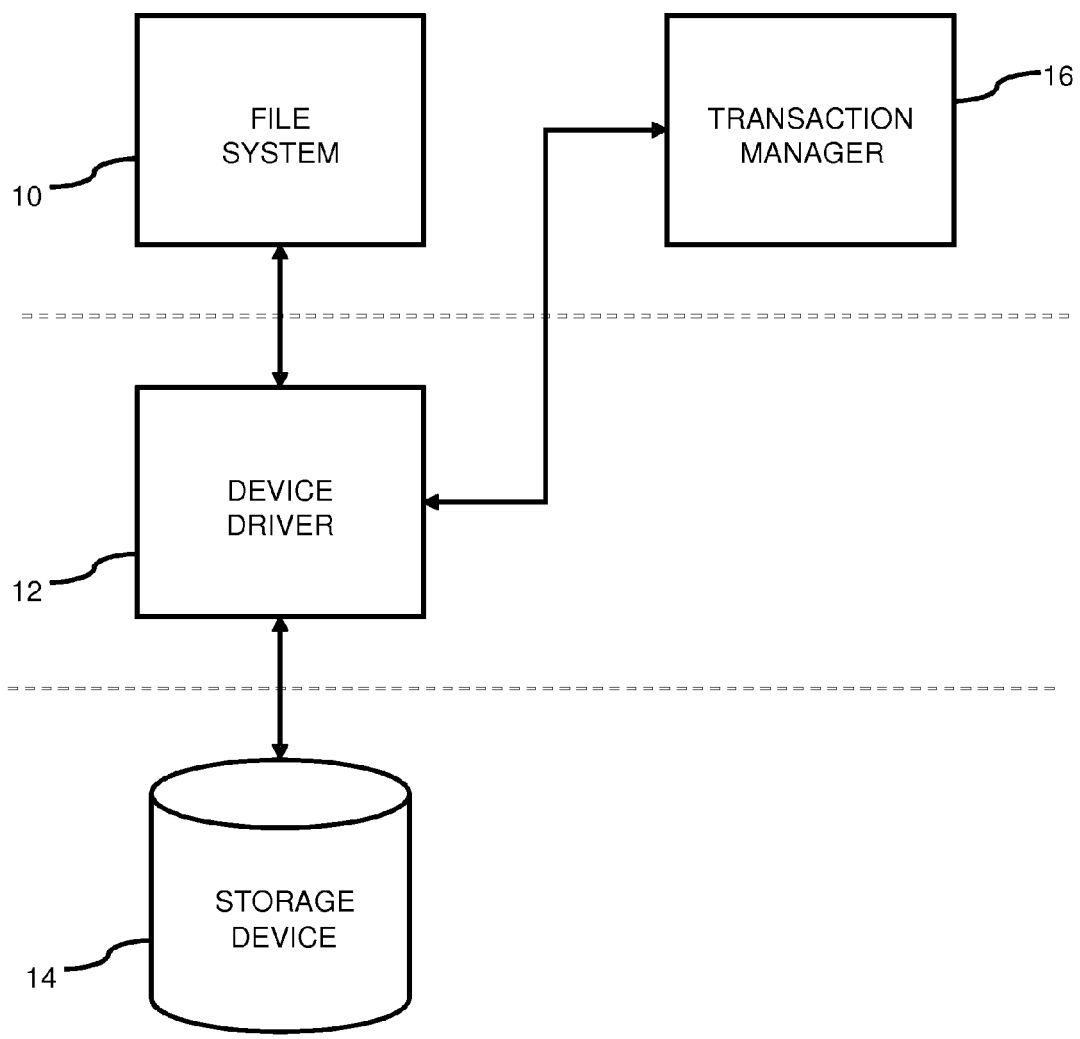
FIG. 1 is a schematic diagram of a system comprising a storage device and connected components.

A system is schematically illustrated in FIG. 1. The system comprises a file system 10 that communicates with a device driver 12 specific to a storage device 14 (e.g., disk). The device driver 12 is in communication with a transaction manager 16. The file system 10 and the transaction manager 16 are software components located on one or more servers that make up a storage area network (SAN) along with the storage device 14. There may be a large number of servers and storage devices interconnected together to form the overall network. The device driver 12 may be a purely software component or alternatively may comprise a software component and a physical layer.

The software components of the file system 10 and the transaction manager 16 have application interfaces to external applications that are running within the storage area network. For example, the network may manage a commercial website receiving orders for goods to be purchased, and the storage device 14 may store customer orders as they are made via the website. In such case, an application is being run within the network, which has a user interface through the website to receive orders and to take the necessary actions, such as creating orders for storage by the storage device 14. The application interacts with the file system 10 in order to write data to the storage device 14.

The transaction manager 16 is a software component that ensures that any actions taken within the network conform to a desired level of transaction processing. Transaction processing is designed to maintain a computer system such as the network being discussed in a known, consistent state by ensuring that any interdependent operations carried out via the system are either all completed successfully or all cancelled successfully. Each unit of work within the network may be handled through the transaction manager 16, which ensures the consistency of each unit of work. Transaction processing protects against hardware and software errors that might leave a transaction only partially completed and the network in an unknown, inconsistent state. If the network (or any component or connection therein) fails during a transaction, the transaction manager 16 ensures that all operations in any uncommitted (i.e., not completely processed) transactions are cancelled.

Figure 2:
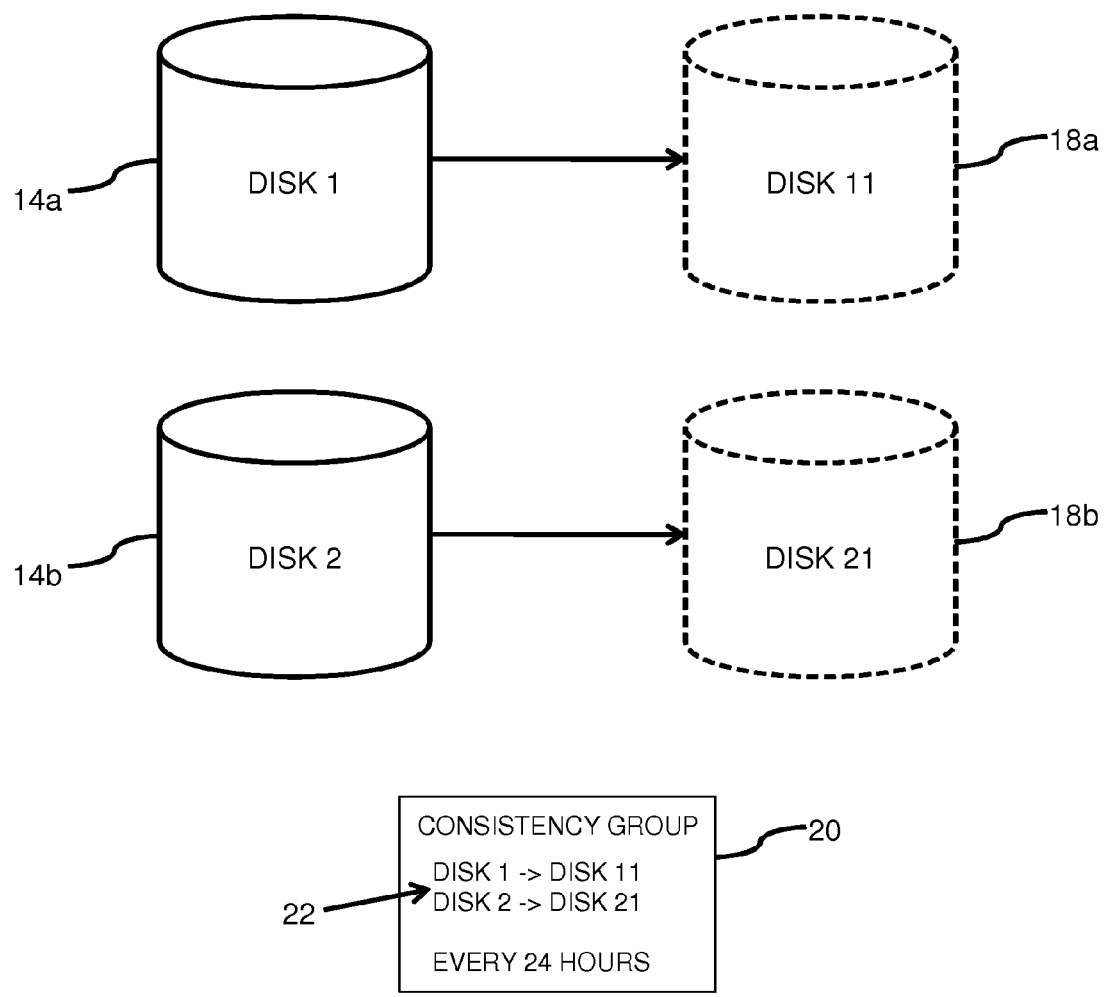
FIG. 2 is a schematic diagram of further storage devices and a consistency group.

As mentioned herein, multiple storage devices 14 may be deployed in practical implementations of enterprise storage systems. FIG. 2 shows a system that includes two storage devices 14a and 14b. Disk 1 may be the storage device 14a for website order details, and Disk 2 may be the storage device 14b for the user account details of website customers. Since the accuracy and stability of the data stored by the storage devices 14 is of paramount importance, backup storage devices 18a and 18b may be defined for the storage devices 14a and 14b respectively. The backup storage devices 18 need not be at the same location as the principal storage disks 14. In fact, placing the backup storage devices 18 at separate locations may enhance overall data security.

When the system of storage devices 14 and backup storage devices 18 is set up, an administrator may define a storage device backup consistency group 20 for the storage devices 14. The consistency group 20 may define the location of the backup storage device 18 for each respective storage device 14. Backup listings 22 may define links from a first location to a second location, with each link defining the source and target for a defined backup procedure such as a flashcopy. The consistency group 20 also may define a period during which a backup should be made. In the example of FIG. 2, a backup should be made every 24 hours. Other time periods may be used.

Figure 3:
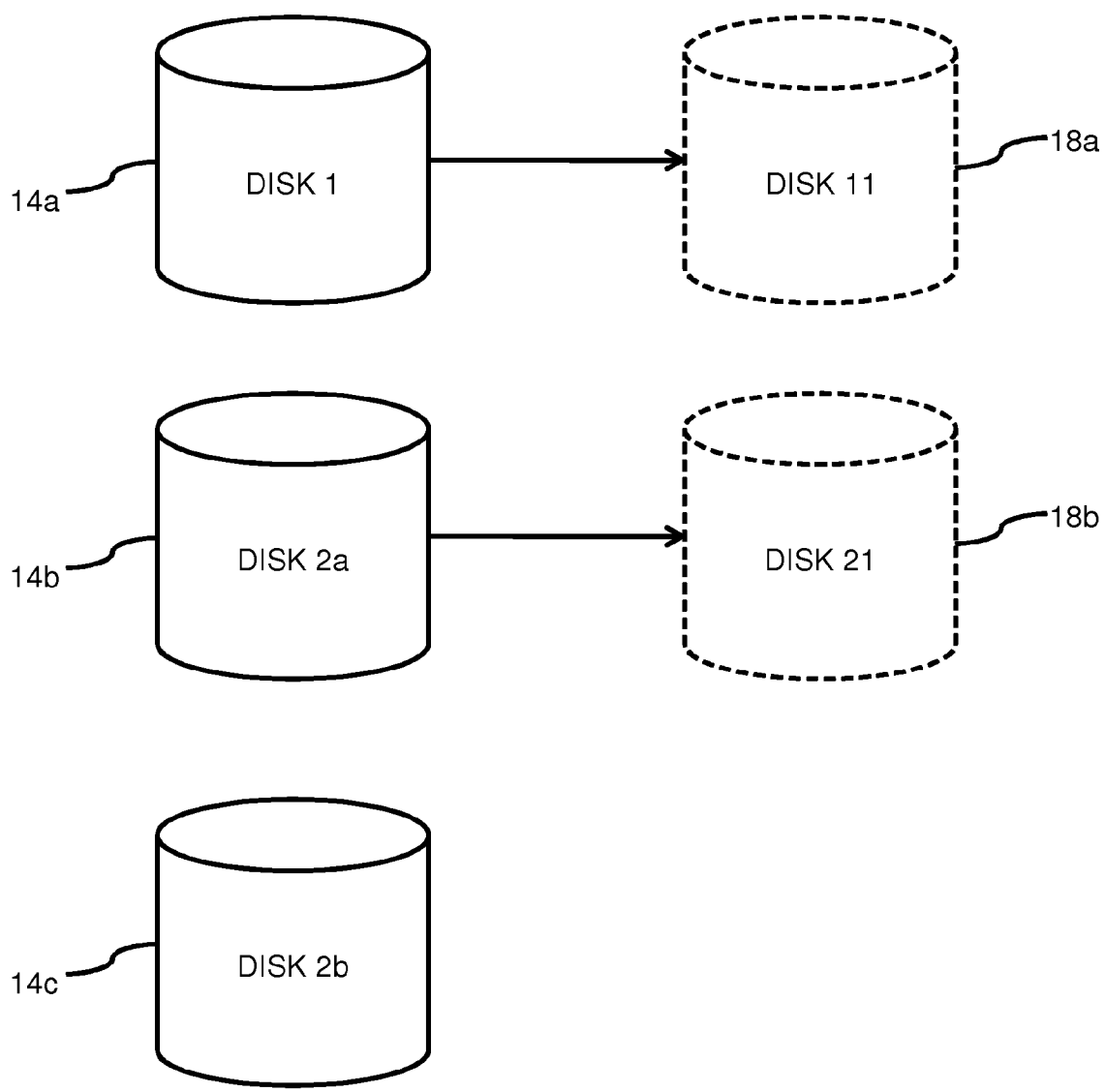
FIG. 3 is a schematic diagram showing the storage devices of FIG. 2 following the addition of another storage device.

The nature of enterprise systems is that they may be changed at a future date, either in response to a business decision or in response to a technology decision. FIG. 3 shows an example of the system of FIG. 2 after such a change has been made. In this case, an additional storage device 14c has been added to the collection of storage devices 14. As previously mentioned, Disk 2 (storage device 14b) of FIG. 2 may store the user account details of website customers. As reflected in FIG. 3, a change that has been made is to split the data stored by Disk 2 into two separate disks, Disk 2a (storage device 14b) and Disk 2b (storage device 14c). For example, it may be that a business decision has been made to move the certain client credit details to a separate Disk 2b (storage device 14c) so that a higher level of security can be applied to these details.

The addition of the new storage device 14c must be handled by an administrator or a team of appropriately qualified people. One important factor in the consideration of the new system created by the addition of the storage device 14c is the creation of a backup for the new storage device 14c. There are three possible scenarios for the backup. The first scenario is that no backup at all will be created when the new storage device 14c is added to the system. The second scenario is that a backup will be created, but the backup will not be included in the consistency group 20 for the storage devices 14. The third scenario is that a backup will be created, and it will be included in the consistency group 20 for the storage devices 14. Obviously, the first two options are not ideal, as they will result in an inappropriate level of data security being present in the system.

The system according to an exemplary embodiment may be adapted to automatically detect and address any sub-par handling of backup within the system, as might occur through the first two scenarios mentioned herein. Such corrective action may be achieved via interaction between the device driver 12 for a disk 14 and the transaction manager 16. The device driver 12 can detect any I/O command that is executed under a transaction involving different disks 14 and can suggest to the transaction manager 16 that the disks 14 be dynamically composed into an appropriate consistency group.

The basic idea in the context of the various embodiments is that there is a way to identify which disks 14 are updated "together" as part of the same unit of work. This unit of work can be defined using a transaction identifier. Therefore, when more than one disk 14 is updated as part of the same transaction, a device driver 12 aware of the transaction can suggest to the transaction manager 16 that the disks 14 be dynamically composed into the same flashcopy consistency group, since their updating is being done under one unit of work, and the ACID properties of transactions signify that the transaction is a unit of work wherein all of the updates of the disks 14, as an atomic group, take the system from one consistent state to another.

For example, a scenario is contemplated in which the device driver 12 detects an I/O command occurring to a disk 14 that is defined to have a first copy relationship as part of a particular transaction. Subsequently, the device driver 12 detects an I/O write command to another disk 14 that does not have a similar copy relationship or that has a second copy relationship that is not part of the same consistency group as the first copy relationship for the other disks that have been updated as part of the particular transaction. In such a scenario, action can be taken to correct the situation in accordance with an exemplary embodiment.

According to an exemplary embodiment, the transaction manager 16 can take one or more advantageous corrective action(s) as configured by the user. For example, if a consistency group exists with respect to the first copy relationship, the transaction manager 16 can invalidate the problematic I/O command, issue a warning to the error log, automatically add the second copy relationship (if existing) to the consistency group so that all I/O commands in the transaction are part of the same consistency group, and/or create a copy relationship similar to that of the other disks 14 followed by action adding the newly created copy relationship to the consistency group. If no consistency group exists, a new consistency group may be created dynamically, the first copy relationship and the second copy relationship (already existing or newly created) may be added to the newly created consistency group.

The corrective actions are selectable by the user and configured alongside the user-created (core) copy relationship. This can be seen to allow for the dynamic composition of consistency groups based on the actual footprint of the applications' workload to enable a consistent snapshot to be taken by, for example, a flashcopy. Alternatively, it may allow for the automatic flagging of omissions in the already created consistency groups (either remote copy or flash copy). Accordingly, if a user did not back up a particular disk 14 (that is part of the set of disks 14 used by a server) via the creation of a flashcopy and/or did not add the particular disk 14 to the correct flashcopy consistency group, then the relevant component in the system can create an appropriate error/warning message or take further action as desired. Alternatively, if an application is "wandering off" and updating disks that are outside of the consistency group that the storage architect has assigned for its use, the storage architect can be appropriately informed and "preempt" any problems that have surfaced with respect to the intended storage schema/use.

Figure 4:
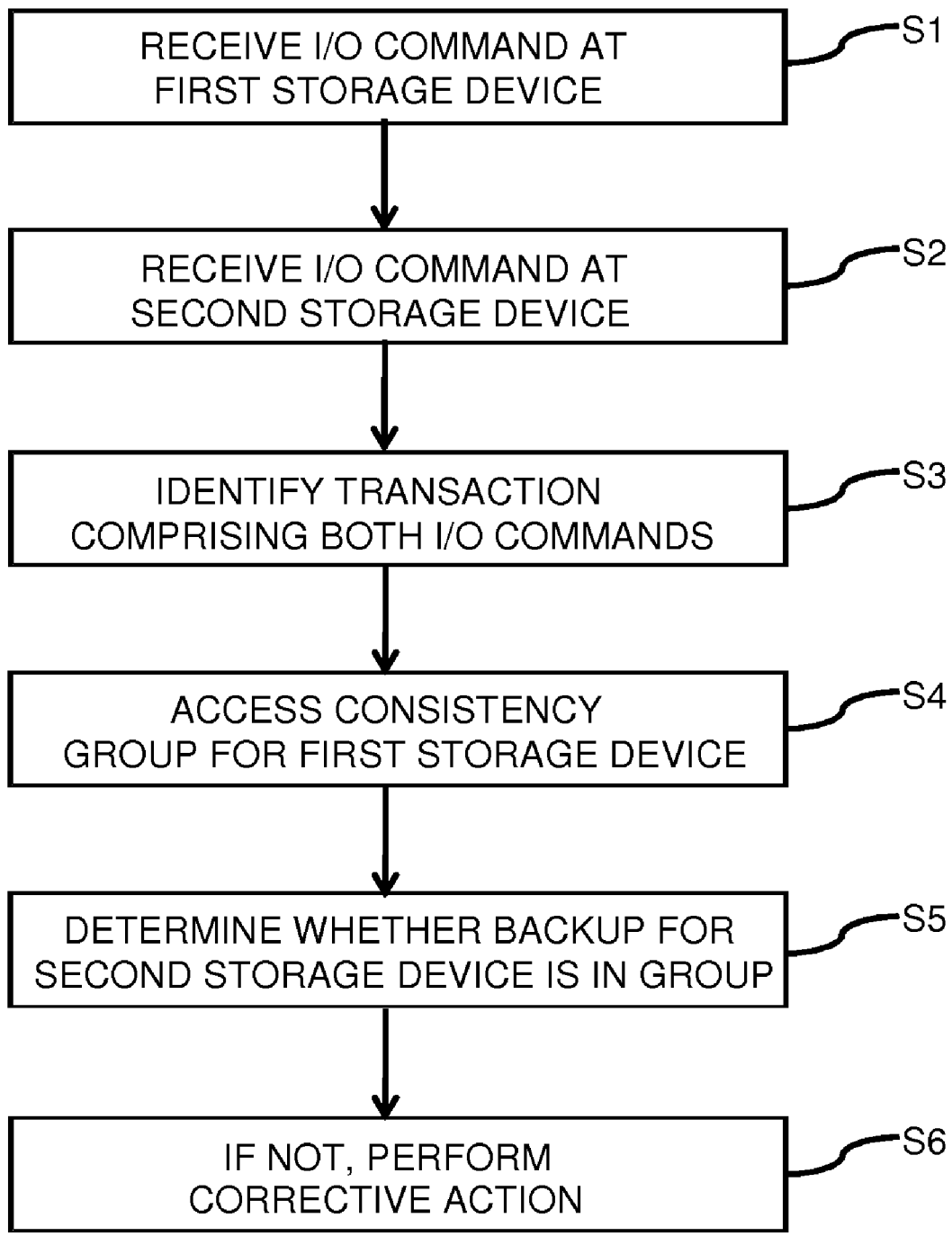
FIG. 4 is a flowchart of a method for maintaining a storage device backup consistency group in accordance with an exemplary embodiment.

FIG. 4 provides a flowchart illustrating the method for maintaining a storage device backup consistency group in accordance with an exemplary embodiment. Firstly, in step Si the method comprises receiving a first I/O command for a first storage device 14. Secondly, in step S2 the method comprises receiving a second I/O command for a second storage device 14. In the context of FIG. 3, the first storage device may be the storage device 14b (Disk 2a), and the second storage device may be the storage device 14c (Disk 2b).

Subsequently, in step S3 the method comprises identifying a transaction that comprises both the first I/O command and the second I/O command. More specifically, in response to an I/O command received for a connected storage device 14, the device driver 12 is configured to communicate with the transaction manager 16 to access details of other storage devices 14 that are also addressed within the same transaction. Accordingly, the storage devices 14 addressed within the same transaction are linked together. The transaction manager 16, using for example a two-phase commit process, links together the various storage devices 14 that are addressed in the same transaction, and such action is used in step S3 to determine whether the two I/O commands received in steps S1 and S2 relate to the same transaction.

Subsequently, in step S4 the method comprises accessing a storage device backup consistency group 20 for the first storage device 14. The device driver 12 or the transaction manager 16 can access the known location for the consistency group 20 to ascertain the members of the consistency group 20. Then, in step S5 the method comprises determining whether a backup for the second storage device is a member of the consistency group 20. If it is determined that a backup for the second storage device is not a member of the consistency group 20, then in step S6 a predefined corrective action is performed. As discussed herein, this action can assume different forms. For example, as previously discussed a backup for the second storage device may be created and may be added to the consistency group 20. Alternatively, if a backup for the second storage device already exists, then such backup may be added to the consistency group 20. Accordingly, consistency may be maintained across the storage devices that are within the transaction.

An additional exemplary embodiment, specific to a storage controller system that uses flashcopy as the backup protocol, is defined by the following algorithm (composed in pseudocode):

While the algorithm has been presented in terms of flashcopy consistency groups, it should be noted that the same idea could be applied to remote copies.

The illustration of the various embodiments described herein with reference to the drawings is provided for a better understanding of the characteristics and spirit of these embodiments. It will be understood that the various embodiments are not limited to the particular exemplary embodiment described herein but rather are capable of various modifications and rearrangements without departing from their scope. Therefore, it is intended that the following claims, accompanied by detailed descriptions giving the broadest explanation, not only define the scope of the various embodiments but also cover all modifications and changes that fall within their true spirit and scope.

The invention claimed is:

1. A method comprising:
    receiving a first I/O command for a first storage device;
    receiving a second I/O command for a second storage device;
    identifying a transaction comprising both the first I/O command and the second I/O command;
    accessing a storage device backup consistency group for the first storage device;
    determining whether a backup for the second storage device is a member of the storage device backup consistency group; and
    performing a predefined corrective action if a backup for the second storage device is not a member of the storage device backup consistency group.

```
1) A transactionally aware device driver accepts an I/O command to a particular storage
controller disk
        if ( there is a current transaction ) {
2)          along with the I/O command the device driver sends a transaction
            identifier "x" to the storage controller
3)          if ( the storage controller notices that the disk to which the I/O command is
            being sent is the source disk for a flashcopy ){
4)              if ( the flashcopy is part of a consistency group ){
                    let CGx = the consistency group of the flashcopy
                    let TXx = the current transaction as informed by the device
                    driver
                    if ( there already exists a { CG?, TXx } pairing in
                    Transaction<->ConsistencyGroup correlation table ){
                        if ( CGx != CG? ) {
                            [take corrective action as configured by user]
                        }
                        else {
                            return
                        }
                    }
                    else {
                        storage controller adds the { CGx, TXx } pairing to
                        Transaction<->ConsistencyGroup correlation table
                    }
                }
                else {
                    [take corrective action as configured by user ]
                }
            }
5)          if ( the device driver is informed of transaction completion ) {
                device driver informs storage controller of transaction completion
                storage controller deletes the {CGx, TXx} pairing from
                Transaction<->ConsistencyGroup correlation table
            }
        }
        Execute the I/O command as normal
        Return to step 1)
```

2. The method according to claim 1, further comprising dynamically creating the storage device backup consistency group.

3. The method according to claim 1, wherein performing the predefined corrective action comprises:
   detecting a backup for the second storage device; and
   adding the detected backup to the storage device backup consistency group.

4. The method according to claim 1, wherein performing the predefined corrective action comprises:
   creating a backup for the second storage device; and
   adding the created backup to the storage device backup consistency group.

5. The method according to claim 1, wherein performing the predefined corrective action comprises invalidating the second I/O command.

6. The method according to claim 1, wherein performing the predefined corrective action comprises issuing a warning.

7. A system comprising:
   a device driver implemented in hardware for receiving a first I/O command for a first storage device and receiving a second I/O command for a second storage device; and
   a transaction manager for identifying a transaction comprising both the first I/O command and the second I/O command, accessing a storage device backup consistency group for the first storage device, determining whether a backup for the second storage device is a member of the storage device backup consistency group, and performing a predefined corrective action if a backup for the second storage device is not a member of the storage device backup consistency group.

8. The system according to claim 7, wherein the transaction manager dynamically creates the storage device backup consistency group.

9. The system according to claim 7, wherein the transaction manager performs the predefined corrective action by detecting a backup for the second storage device and by adding the detected backup to the storage device backup consistency group.

10. The system according to claim 7, wherein the transaction manager performs the predefined corrective action by creating a backup for the second storage device and by adding the created backup to the storage device backup consistency group.

11. The system according to claim 7, wherein the transaction manager performs the predefined corrective action by invalidating the second I/O command.

12. The system according to claim 7, wherein the transaction manager performs the predefined corrective action by issuing a warning.

13. A computer program product comprising a non-transitory computer-readable storage medium having computer-readable program code instructions stored therein comprising:
   a first set of computer instructions for receiving a first I/O command for a first storage device;
   a second set of computer instructions for receiving a second I/O command for a second storage device;
   a third set of computer instructions for identifying a transaction comprising both the first I/O command and the second I/O command;
   a fourth set of computer instructions for accessing a storage device backup consistency group for the first storage device;
   a fifth set of computer instructions for determining whether a backup for the second storage device is a member of the storage device backup consistency group; and
   a sixth set of computer instructions for performing a predefined corrective action if a backup for the second storage device is not a member of the storage device backup consistency group.

14. The computer program product according to claim 13, further comprising a seventh set of computer instructions for dynamically creating the storage device backup consistency group.

15. The computer program product according to claim 13, wherein the sixth set of computer instructions comprises:
   an eighth set of computer instructions for detecting a backup for the second storage device; and
   a ninth set of computer instructions for adding the detected backup to the storage device backup consistency group.

16. The computer program product according to claim 13, wherein the sixth set of computer instructions comprises:
   a tenth set of computer instructions for creating a backup for the second storage device, and
   an eleventh set of computer instructions for adding the created backup to the storage device backup consistency group.

17. The computer program product according to claim 13, wherein the sixth set of computer instructions comprises a twelfth set of computer instructions for invalidating the second I/O command.

18. The computer program product according to claim 13, wherein the sixth set of computer instructions comprises a thirteenth set of computer instructions for issuing a warning.

* * * * *